US012559174B2

(12) United States Patent
Gloster

(10) Patent No.: US 12,559,174 B2
(45) Date of Patent: Feb. 24, 2026

(54) SPLAYED INSTALLATION OF VEHICLE CORNER MODULES

(71) Applicant: REE AUTOMOTIVE LTD., Kibbutz Glil-Yam (IL)

(72) Inventor: Maurice Paul Gloster, Southam (GB)

(73) Assignee: REE AUTOMOTIVE LTD, Glil-Yam (IL)

( * ) Notice: Subject to any disclaimer, the term of this patent is extended or adjusted under 35 U.S.C. 154(b) by 0 days.

(21) Appl. No.: 18/953,237

(22) Filed: Nov. 20, 2024

(65) Prior Publication Data

US 2025/0083743 A1 Mar. 13, 2025

Related U.S. Application Data

(63) Continuation of application No. PCT/IB2023/057374, filed on Jul. 19, 2023.

(60) Provisional application No. 63/390,654, filed on Jul. 20, 2022.

(51) Int. Cl.
*B62D 9/02* (2006.01)
*B60G 21/00* (2006.01)

(52) U.S. Cl.
CPC ............. *B62D 9/02* (2013.01); *B60G 21/005* (2013.01)

(58) Field of Classification Search
CPC ........ B62D 9/02; B62D 63/025; B62D 21/11; B60G 21/005; B60K 7/0007; B60K 2007/0053
See application file for complete search history.

(56) References Cited

U.S. PATENT DOCUMENTS

| | | | |
|---|---|---|---|
| 11,180,207 | B2 | 11/2021 | Sardes |
| D944,684 | S | 3/2022 | Aknin |
| 11,267,522 | B2 | 3/2022 | Sardes |
| 11,299,200 | B1 | 4/2022 | Starik |
| 11,332,005 | B2 | 5/2022 | Aknin |
| D954,613 | S | 6/2022 | Aknin |
| 11,448,308 | B2 | 9/2022 | Starik |
| D966,952 | S | 10/2022 | Boaz |
| D966,953 | S | 10/2022 | Boaz |

(Continued)

FOREIGN PATENT DOCUMENTS

| | | |
|---|---|---|
| CN | 212950823 U | 4/2021 |
| DE | 102019128212 A1 | 4/2021 |

(Continued)

OTHER PUBLICATIONS

International Search Report for PCT/IB2023/057374 dated Nov. 28, 2023.
Written Opinion for PCT/IB2023/057374 dated Nov. 28, 2023.

*Primary Examiner* — Paul N Dickson
*Assistant Examiner* — Shams Dhanani
(74) *Attorney, Agent, or Firm* — PEARL COHEN ZEDEK LATZER BARATZ LLP

(57) ABSTRACT

A vehicle including a vehicle platform having a reference frame, the reference frame arranged along a longitudinal axis. A first vehicle corner module (VCM) is connected to one side of the reference frame and a second VCM is connected to an opposing side of the reference frame. The first and second VCMs are adapted for regulating motion of the vehicle. A sub-frame of at least one of the first VCM and the second VCM is disposed at a splay angle relative to the longitudinal axis.

22 Claims, 6 Drawing Sheets

(56)                    References Cited

U.S. PATENT DOCUMENTS

| | | | | |
|---|---|---|---|---|
| 11,465,636 | B2 | 10/2022 | Sutton | |
| 11,465,699 | B1 | 10/2022 | Sardes | |
| 11,479,295 | B1 | 10/2022 | Kenion | |
| 11,479,313 | B2 | 10/2022 | Sardes | |
| 11,524,667 | B2 | 12/2022 | Orlov | |
| 11,654,987 | B2 | 5/2023 | Sardes | |
| 11,667,192 | B2 | 6/2023 | Aknin | |
| 11,667,328 | B2 | 6/2023 | Kenion | |
| 11,780,285 | B2 | 10/2023 | Jefferies | |
| 11,840,247 | B2 | 12/2023 | Barel | |
| 11,845,455 | B2 | 12/2023 | Sutton | |
| 11,891,138 | B2 | 2/2024 | Sardes | |
| 11,919,357 | B2 | 3/2024 | Jefferies | |
| 2001/0028154 | A1* | 10/2001 | Sebe | B62D 9/02 |
| | | | | 280/86.757 |
| 2020/0003277 | A1 | 1/2020 | Sardes | |
| 2020/0317018 | A1* | 10/2020 | Nong | G05D 1/027 |
| 2022/0055586 | A1 | 2/2022 | Orlov | |

FOREIGN PATENT DOCUMENTS

| | | | |
|---|---|---|---|
| WO | 2020/008452 | A1 | 1/2020 |
| WO | 2022/254382 | A1 | 12/2022 |
| WO | 2023/007308 | A1 | 2/2023 |

\* cited by examiner

SPLAYED INSTALLATION OF VEHICLE CORNER MODULES

CROSS-REFERENCE TO RELATED APPLICATIONS

This patent application is a continuation of PCT Patent Application No. PCT/IB2023/057374, filed Jul. 19, 2023, which claims the benefit of U.S. Provisional Patent Application No. 63/390,654, filed Jul. 20, 2022, which is incorporated by reference herein in its entirety.

FIELD OF THE INVENTION

The present invention relates to Vehicle Corner Modules (VCMs) for regulating the motion of a vehicle, and particularly to installation of the VCMs on a reference frame of a vehicle.

BACKGROUND OF THE INVENTION

When steering the wheels of a vehicle for turning, the steered wheels on one side of the vehicle must turn to a greater extent than the wheels on the other side of the vehicle, because of the different radii between the inner and outer wheels, and the turning point. The Ackermann steering geometry defines the required steering angles of each wheel to facilitate such different radii, while avoiding the need for tires to slip sideways while following a path around a curve. The maximal rotation angle of wheel, also known as the wheel lock angle, also impacts the steering geometry. The Ackermann geometry is shown in prior art FIG. 1A. Specifically, the Ackermann formula computes, for a given turn radius R, wheelbase L, and track width T, the required front steering angles $\delta_{f,in}$ and $\delta_{f,out}$ using the following expressions:

$$\delta_{f,in} = \tan^{-1}\left(\frac{L}{R-\frac{T}{2}}\right) \delta_{f,out} = \tan^{-1}\left(\frac{L}{R+\frac{T}{2}}\right)$$

The lock angle with perfect Ackermann geometry for a front steered vehicle is shown in prior art FIG. 1B. The formulae to calculate these lock angles from a kerb-to-kerb turning circle, are defined by:

$$\delta_{f,out} = 90 - \cos^{-1}(L/R_o); \text{ and}$$

$$\delta_{f,in} = \tan^{-1}(L/((R_o \times \cos\delta_{f,out}) - T))$$

where K2K is the kerb-to-kerb turning circle (to the outer face of the tire) and $R_o$=(K2K−tire width)/2. Note that for vehicles with all wheel steering, the wheelbase in FIG. 1B is divided by 2.

In recent years, autonomous and electric cars have been developed. One of the technologies that assists in the development of autonomous and electric cars is that of the vehicle-corner-module (VCM), to which the wheels are typically mounted, and as such VCMs are also known as wheel-corner-modules.

In some VCM-based vehicles, it is desirable to use the same VCM on both sides of the vehicle. In other words, the VCM is "non-handed"—it is not a left-side VCM or a right-side VCM, but rather a VCM usable on both sides of the vehicle. Use of non-handed VCMs is advantageous in that it reduces the number of unique parts of a vehicle, and makes the VCM more generic than when using handed VCMs. However, a non-handed VCM also means that both wheels have the same available, or possible, maximal inner and outer lock angles, and meeting the Ackermann steering geometry to minimize wear of the tires may result in not using the full lock angle available on the outer tire. Alternately, the turning circle may be worse or the tire may suffer excessive wear.

There is therefore a need for VCM based vehicles in which maximal steering angles may be achieved, while using non-handed VCMs and using the Ackermann geometry to reduce wear of the tires.

SUMMARY OF EMBODIMENTS OF THE INVENTION

Some embodiments of the invention relate to VCMs for regulating the motion of a vehicle, and particularly to permanently or temporarily splayed installation of the VCMs on a reference frame, to improve the turning circle of the vehicle.

There is thus provided, in accordance with embodiments of the teachings herein a vehicle including:

a vehicle platform including a reference frame, the reference frame arranged along a longitudinal axis and including at least first and second VCM-connection interfaces, disposed on opposing sides of the vehicle platform;

a first vehicle corner module (VCM) connected to the first VCM-connection interface and a second VCM connected to the second VCM connector interface, the first and second VCMs adapted for regulating motion of the vehicle, each of the first and second VCMs including:

a sub-frame including a vehicle-connection interface reversibly and mechanically engaging a corresponding one of the first and second VCM-connection interfaces;

a wheel-hub assembly including a wheel-hub adapted for mounting of a wheel thereon; and at least one subsystem of the vehicle, mounted onto the sub-frame, the at least one subsystem being selected from the group of subsystems consisting of a drive subsystem, a steering subsystem, a suspension subsystem, and a braking subsystem, wherein, at least one of the first VCM and the second VCM is disposed at a splay angle relative to the longitudinal axis.

In some embodiments, the first VCM and the second VCM are installed at the splay angle relative to the longitudinal axis.

In some embodiments, the sub-frame of the at least one of the first VCM and the second VCM is disposed at the splay angle relative to the longitudinal axis. In some embodiments, the sub-frames of each of the at least one of the first VCM and the second VCM are disposed at the splay angle relative to the longitudinal axis.

In some embodiments, the splay angle (per corner) is in the range of 3 degrees to 10 degrees. In some embodiments, e.g. using vehicles of common proportions, the splay angle is in the range of 5 degrees to 8 degrees.

In some embodiments, the sub-frames of the first and second VCMs are identical to one another.

In some embodiments, the first and second VCMs are non-handed, such that each of the first and second VCMs can be installed on either the left or the right side of the reference frame of the vehicle.

In some embodiments, each of the first and second VCMs includes a wheel mounted onto the wheel-hub thereof, and wherein, when the wheels of the first and second VCMs are rotated in a first direction to their maximal lock angle, the wheels maintain Ackermann geometry.

In some embodiments, the vehicle further includes at least one pivoting actuator, adapted to actuate pivoting of the sub-frame of at least one of the first and second VCMs relative to the longitudinal axis of the reference frame, between a first operative orientation and a second operative orientation, wherein in the first operative orientation the sub-frame of the VCM is disposed at the splay angle relative to the longitudinal axis, and in the second operative orientation the sub-frame is disposed parallel to the longitudinal axis.

In some embodiments, the at least one pivoting actuator includes a single pivoting actuator, adapted to actuate pivoting of the subframes of the first and second VCMs relative to the longitudinal axis of the reference frame. In some embodiments, the single pivoting actuator is adapted to actuate pivoting of the subframe of the first VCM in a first direction, and to actuate pivoting of the subframe of the second VCM in a second direction, the second direction being opposite to the first direction.

In some embodiments, the at least one pivoting actuator includes a first pivoting actuator adapted to actuate pivoting of the subframe of the first VCM relative to the longitudinal axis, and a second pivoting actuator adapted to actuate pivoting of the subframe of the second VCM relative to the longitudinal axis.

In some embodiments, the subframes of the first and second VCMs installed onto to the reference frame at the splay angle, and the splay angle remains static throughout connection of the first and second VCMs to the reference frame.

In some embodiments, the subframes of the first and second VCMs are disposed at an angle relative to each other.

There is further provided, in accordance with embodiments of the teachings herein a method of installing first and second vehicle corner modules (VCMs) on a vehicle platform, the vehicle platform including a reference frame, the reference frame arranged along a longitudinal axis and including at least first and second VCM-connection interfaces, disposed on opposing sides of the vehicle platform, the method including:

connecting a sub-frame of the first VCM to the first VCM-connection interface and a sub-frame of the second VCM connected to the second VCM connector interface, the first and second VCMs adapted for regulating motion of the vehicle; and adjusting a splay angle of the sub-frames of at least one of the first and second VCMs, relative to the longitudinal axis of the vehicle platform.

In some embodiments, the adjusting includes adjusting the splay angle of the sub-frames of both the first and second VCMs relative to the longitudinal axis of the vehicle platform.

In some embodiments, the adjusting includes adjusting the splay angle in accordance with a desired steering angle.

In some embodiments, the adjusting includes adjusting the splay angle in accordance with at least one parameter of the vehicle platform. In some embodiments, the at least one parameter is selected from the group consisting of a size of the vehicle platform, a condition of the vehicle platform, a type of the vehicle platform, and a load that can be carried by the vehicle platform.

In some embodiments, the adjusting includes adjusting the splay angle in accordance with at least one parameter of at least one of the first and second VCMs.

There is further provided, in accordance with embodiments of the teachings herein a vehicle platform including:

a reference frame, the reference frame arranged along a longitudinal axis;

a first wheel assembly and a second wheel assembly, the first and second wheel assemblies being connected to opposing sides of the reference frame, each of the first and second wheel assemblies including:

a wheel-hub adapted for mounting a wheel thereon;

a steering system adapted for steering the wheel-hub, wherein at least one of the first wheel assembly and the second wheel assembly is disposed at a splay angle relative to the longitudinal axis of the reference frame.

In some embodiments, each of the first wheel assembly and the second wheel assembly is installed at the splay angle relative to the longitudinal axis.

In some embodiments, the splay angle is in the range of 3 degrees to 10 degrees. In some embodiments, the splay angle is in the range of 5 degrees to 8 degrees.

In some embodiments, each of the first and second wheel assemblies includes a wheel mounted onto the wheel-hub thereof, and wherein, when the wheels of the first and second wheel assemblies are rotated in a first direction to their maximal lock angle, the wheels maintain Ackermann geometry.

In some embodiments, the vehicle further includes first and second suspension arms, connected to the reference frame, and functionally associated with the first and second wheel assemblies, respectively.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof.

DETAILED DESCRIPTION OF SOME EMBODIMENTS OF THE INVENTION

Figure 1A:
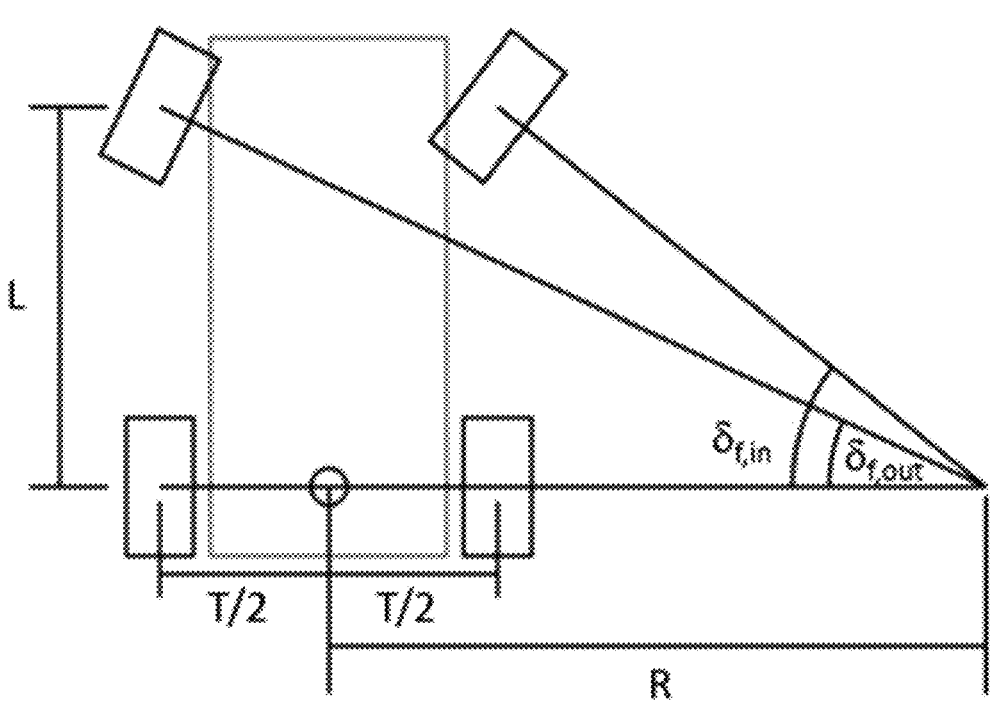
FIGS. 1A and 1B (Prior art) illustrate the Ackermann geometry and formula and the geometry and formula for the kerb-to-kerb turning circle.

The invention, in some embodiments, relates to methods and systems for installing Vehicle Corner Modules (VCMs) on a reference frame, or platform, of the vehicle. These include various interfaces for installing the VCMs on the reference frames, as well as specialized connectors simplifying the installation of the VCMs.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Unless otherwise indicated, a "vehicle corner module" or "VCM" as used herein means an assembly for supporting a wheel of a vehicle and regulating the motion of a vehicle according to any of the embodiments disclosed herein. The VCM assembly includes components such as (and not exhaustively): steering systems, suspension systems, braking systems including hydraulic subsystems, gearing assemblies, drive motors, drive shafts, wheel hub assemblies, thermal systems, controllers, communications arrangements, and electrical wiring. In some embodiments, a VCM can include a wheel and tire. A VCM can be mounted to a 'reference frame' of a vehicle, e.g., a chassis or similar vehicle frame or a platform. When a VCM is described as being installed in/on a vehicle, then the VCM is mounted to the reference frame. A VCM may include a 'sub-frame' to which some or all of the VCM components are mounted or otherwise attached. In some cases, the sub-frame mediates between the reference frame and the various VCM components.

The term 'sub-frame' should be understood to mean any rigid frame or one or more structural elements in fixed combination. The 'sub' prefix is intended to distinguish the sub-frame from a main frame or reference frame of the vehicle. A VCM may or may not include one or more electric motors and/or the wheel itself (and tire).

When used in this specification and in the claims appended hereto, the word "vehicle" is to be understood as referring to a vehicle having two or more wheels. Non-limiting examples of a vehicle, according to this definition, are a vehicle with motive power provided by an onboard engine, and an 'electric vehicle' powered, when in motion, by one or more electric motors and a battery or other energy storage device onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which VCMs can be mounted) and one or more wheels. A 'vehicle platform' need not necessarily comprise, at the time of providing the vehicle platform, all of the accoutrements required for transport of passengers and/or cargo such as vehicle-body components or interior furnishings.

The term "controller" as used herein means a computing device configured for monitoring, controlling, regulating and/or actuating one or more components, systems or subsystems. A controller should be understood to include any or all of (and not exhaustively): one or more processors, one or more computer-readable media, e.g., transient and/or non-transient storage media, communications arrangements, a power source and/or a connection to a power source, and firmware and/or software. When used herein in a hyphenated expression such as vehicle-controller or VCM-controller, the term means a controller for controlling the vehicle and/or components and/or subsystems of the vehicle, or a controller for controlling the VCM and/or components and/or subsystems of the VCM, respectively. Unless specifically noted otherwise, a controller is installed in or on the controlled element (vehicle, VCM, etc.) while a "control unit" is like a controller but is not installed in or on the controlled element. For example, a VCM-controller is located in or on the VCM, while a VCM control unit is not, and may be located elsewhere on the vehicle, e.g., on the chassis unit. Controllers (and control units) can be programmed in advance, e.g., by having program instructions stored in the computer-readable media for execution by one or more processors of the controller. Thus, a controller 'configured' to perform a function is equivalent herein to the controller being programmed, i.e., having access to stored program instructions for execution, to perform the function.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1B:
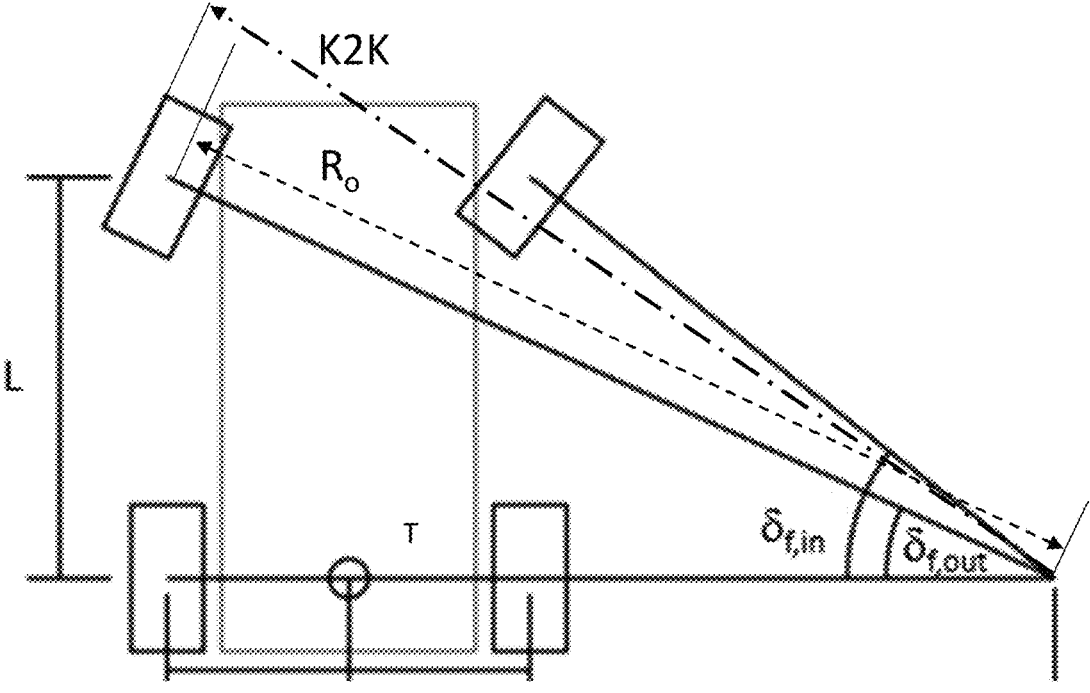
Figure 2:
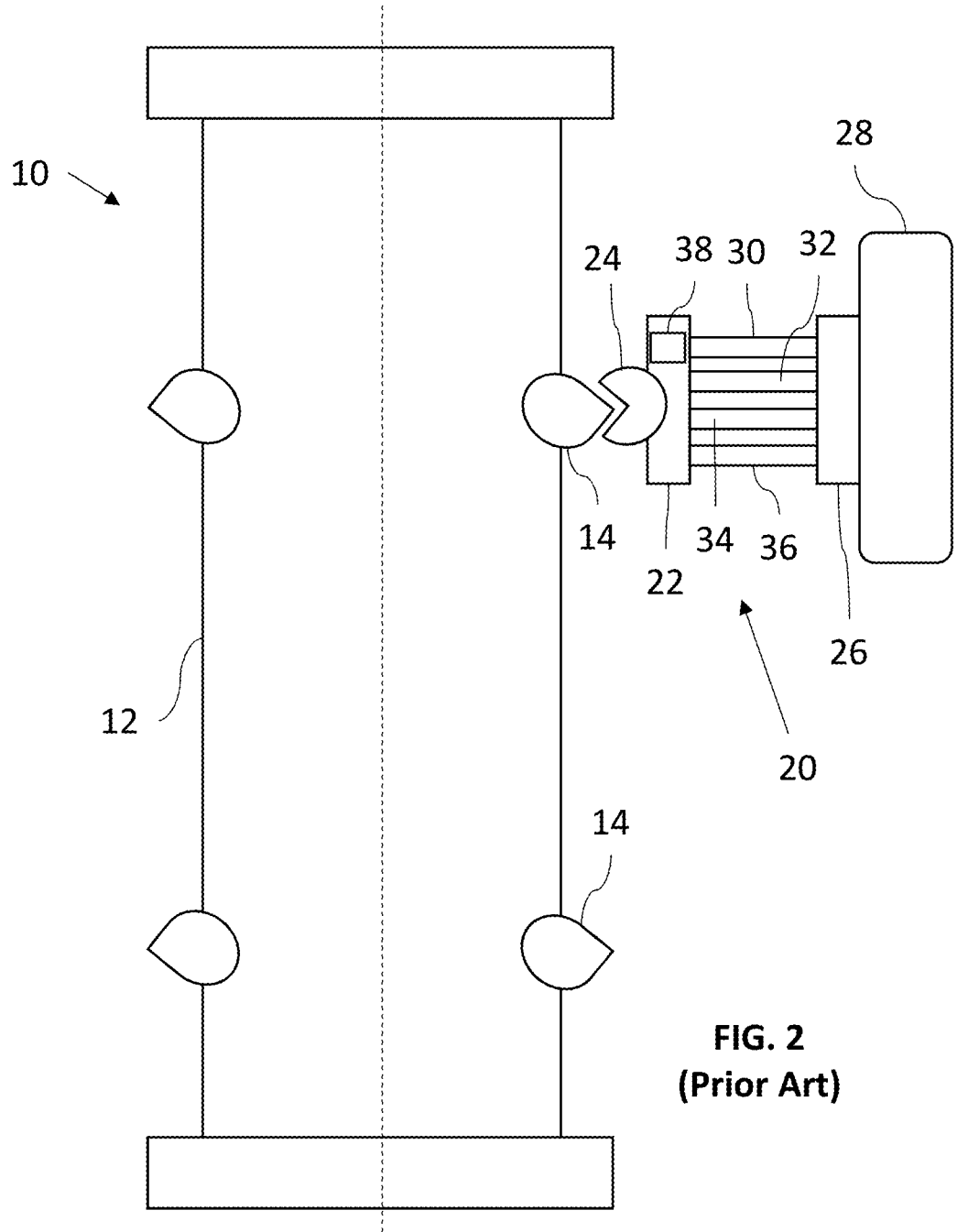
FIG. 2 (Prior art) is a schematic block diagram of a VCM and a vehicle platform adapted to have the VCM mounted thereon.

FIG. 2 (Prior art) is a schematic block diagram of a VCM and a vehicle platform adapted to have the VCM mounted thereon. As seen in FIG. 1, a vehicle platform 10, which is adapted to have a vehicle capsule mounted thereon, includes a vehicle reference-frame 12, having VCM-connection interfaces 14 adapted for connection to VCMs.

A VCM 20, for regulating motion of the vehicle, is connectable to reference frame 12. According to some embodiments, VCM 20 includes a sub-frame 22, including a vehicle-connection interface 24 for connection to VCM-connection interface 14 of reference frame 12. VCM 20 further includes a wheel-hub assembly 26, adapted to have a wheel 28 mounted thereon. Sub-frame 22 has mounted thereon one or more subsystems of the vehicle, each comprising mechanical and/or electrical components. The subsystems may also be attached to wheel-hub assembly 26.

The subsystems included in the VCM may include a drive system 30, a steering system 32, a suspension system 34, and/or a brake system 36. Sub-frame 22 may also include a VCM-controller 38, adapted to control operation of one or more of systems 30, 32, 34, and 36, and/or to communicate with one or more electronic subsystems 16 of the vehicle, such as with a computerized controller or a network interface of the vehicle.

As mentioned hereinabove in the background section, when using non-handed VCMs, i.e. VCMs that are symmetrical, and can be installed on both sides of the vehicle, the lock angle of the VCMs is symmetrical in both directions (when steering to the right and when steering to the left). In this arrangement, it is difficult to reach the maximal turning circle of the wheels, while at the same time meeting the Ackermann geometry.

Figure 3A:
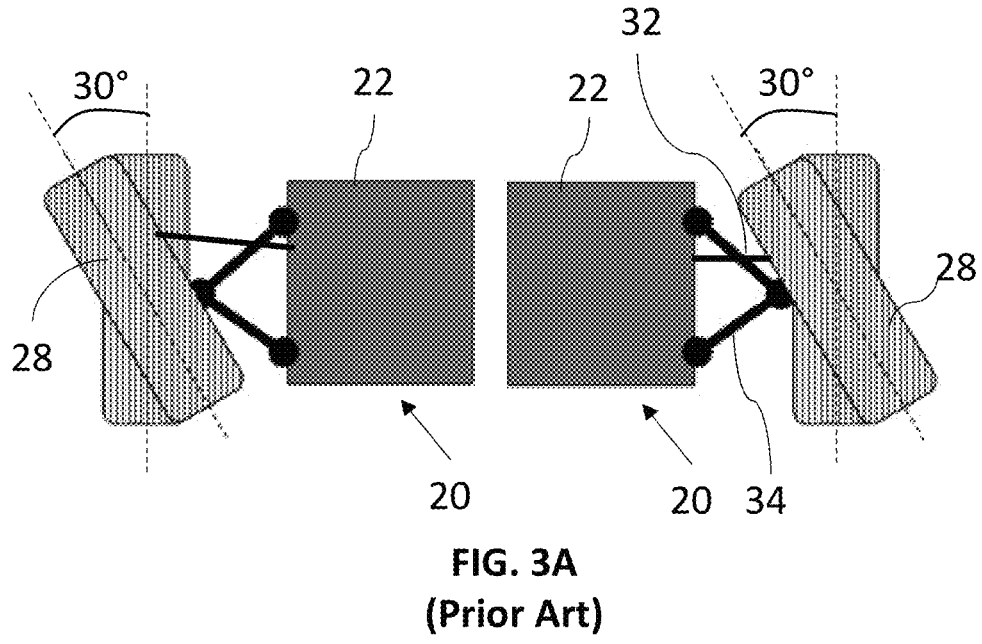
FIGS. 3A and 3B (Prior art) are schematic top-view illustrations of prior art installations of handed VCMs on opposing sides of a vehicle.

For example, FIG. 3A (Prior Art) illustrates two handed VCMs 20 installed on opposing sides of a vehicle, each VCM including a sub-frame 22 and a wheel 28. The sub-frames are installed parallel to one another, and typically parallel to contours of the reference frame (not explicitly shown). Wheels 28 are each connected to sub-frames 22 by a suspension system 34. When VCMs are handed, a steering rod of steering subsystem 32 of each of the opposing VCMs is disposed at the same forward or backward position, with respect to the spin axis of wheels 28, in both VCMs.

FIG. 3A shows an example in which in each VCM 20, the wheel 28 has a maximal lock angle of approximately 30 degrees in both directions. If, when turning, both wheels are rotated to the maximal lock angle of the wheel, in this example 30 degrees, the turning circle would be maximized to 30 degrees. However, the wheels would not be following the Ackermann geometry. As such, the tires, which follow different radii, would scrub against the road, resulting in increased tire wear.

Figure 3B:
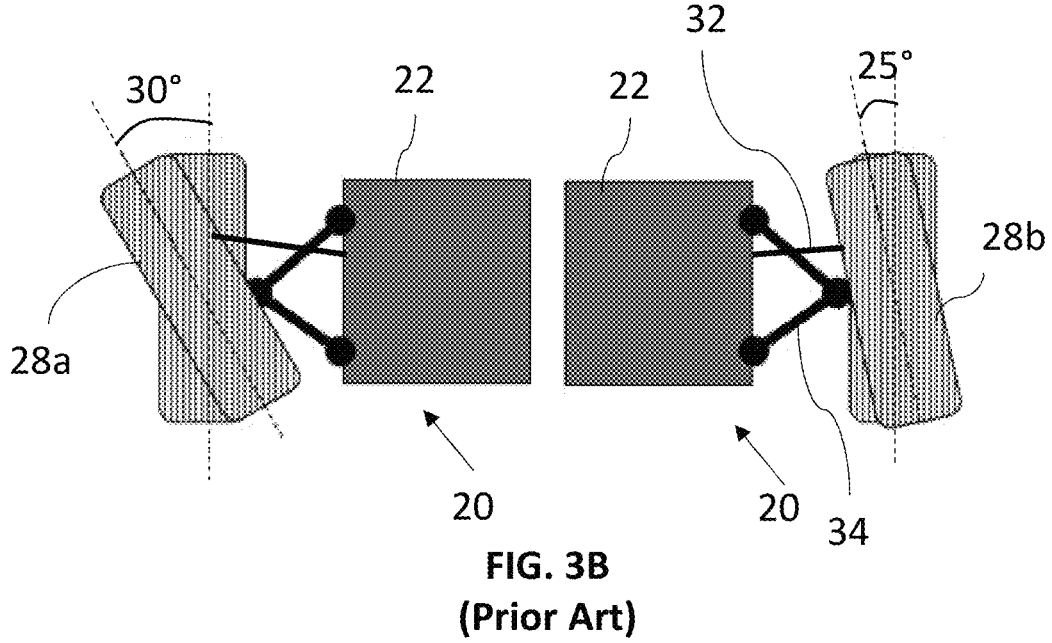

As another example, FIG. 3B (prior art) shows the VCM installation of FIG. 3A, when one tries to turn wheels 28 in accordance with the Ackermann geometry. In this case, the left hand side wheel 28a uses the entire lock angle, and is turned to a greater degree than the right hand side wheel 28b, meeting the Ackermann geometry. As such, tire wear is reasonable. However, the turning circle is defined by the average of the two angles, which is smaller than the maximal lock angle. For example, if wheel 28a is turned to the maximal lock angle of 30 degrees, and wheel 28b is turned to an angle of 25 degrees, the turning circle is defined by the average of these two values, namely 27.5 degrees, resulting in a worse turning circle than in FIG. 3A.

Figure 3C:
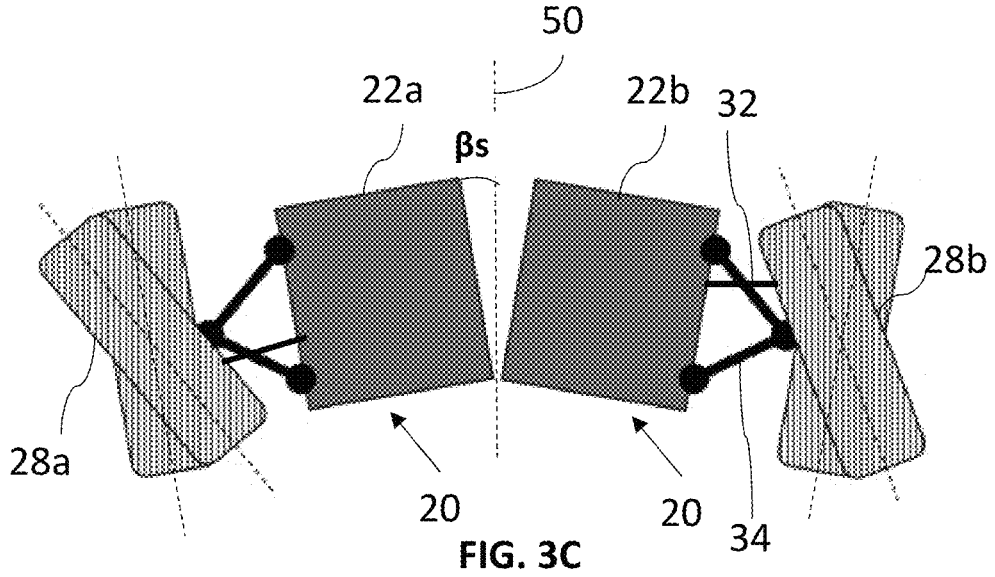
FIGS. 3C and 3D are schematic top-view illustrations of splayed installation of non-handed VCMs on opposing sides of a vehicle, in accordance with an embodiment of the disclosed technology.
Figure 3D:
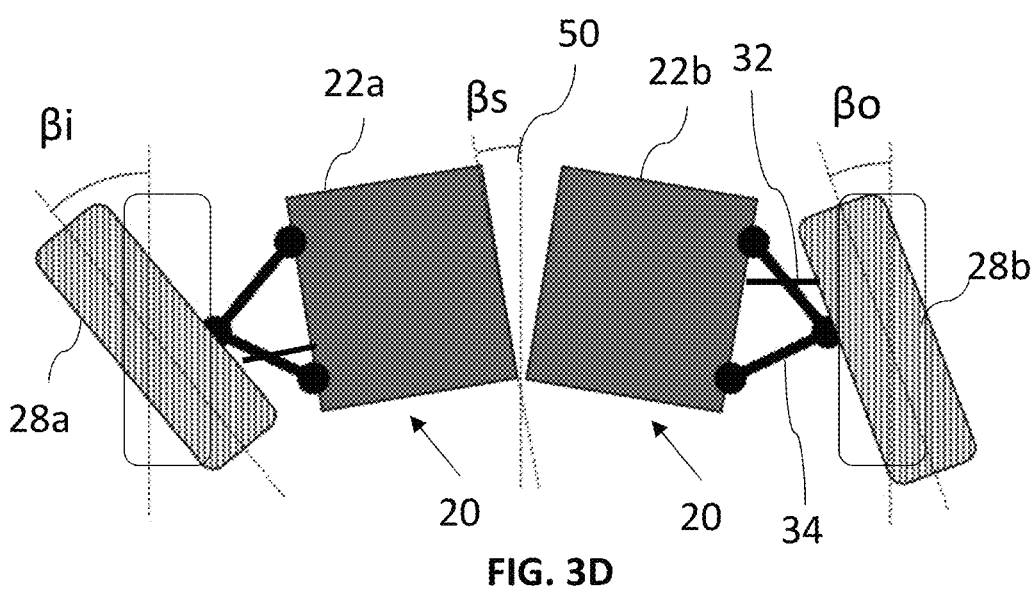

Reference is now made to FIGS. 3C and 3D, which are schematic top view illustrations of splayed installation of non-handed VCMs 20 of FIG. 3A on opposing sides of a vehicle, in accordance with an embodiment of the disclosed technology.

As seen in FIGS. 3C and 3D, sub-frames 22a and 22b are mounted onto the vehicle platform in a non-parallel manner, such that a splay angle βs is formed between each of the sub-frames and a virtual line 50 centered between the sub-frames. The angle βs represents the deviation of each of the sub-frames from being parallel to one another, where the splay angle of sub-frame 22a is in one direction relative to a virtual line 50, and the splay angle of sub frame 22b is in the opposing direction relative to virtual line 50. The splay angles βs of the two sub-frames may be equal or may be different from each other. Virtual line 50 represents, and may coincide with, a longitudinal axis of the reference frame of the vehicle (e.g. reference frame 12, FIG. 2). For a non-handed configuration of VCMs, as seen for example in FIGS. 3C-3D, the steering rods 32 are disposed on the same sides with respect to the spinning axis of wheel 28. A potential advantage is being able to assemble a single non-handed configuration of a VCM at either side of the vehicle platform.

As a result of the splayed installation of VCMs 20, wheels 28a and 28b can both be rotated to the maximal lock angle, while maintaining the Ackermann geometry, as seen in FIG. 3C. This is due to the fact that, when the wheels are parallel to the VCM, outer wheel 28b (here shown as the right hand wheel) is pivoted slightly to the right, such that rotation of the wheel to the full lock angle results in rotation of less than the lock angle relative to a virtual vertical line, indicated as outer lock angle βo in FIG. 3D. Similarly, inner wheel 28a (here shown as the left hand wheel) is pivoted slightly to the left, such that rotation of the wheel to the full lock angle results in rotation of more than the lock angle relative to a virtual vertical line, indicated as inner lock angle βi in FIG. 3D.

As seen in FIGS. 3C and 3D, splayed installation of VCMs 20 may result in one or more of the following configurations:

In some embodiments, when wheels 28a and 28b are aligned with a longitudinal axis of the vehicle platform, for example for driving straight, the wheels are not parallel to the edge of the VCM holding them.

In some embodiments, when starting from a neutral un-steered position of wheels 28a and 28b and steering to one side, one of wheels 28a and 28b can be steered to a greater degree than the other of wheels 28a and 28b. For example, when steering to the left, wheel 28a is steerable to a greater degree than wheel 28b.

In some embodiments, when wheels 28a and 28b are positioned to have an equal steering angle on both steering directions, the rotational axes of wheels 28a and 28b are not perpendicular to longitudinal axis 50 of the reference frame.

In some embodiments, as shown in FIG. 3C, when wheels 28a and 28b are positioned to have an equal steering angle on both steering directions, wheels 28a are 28b in a toe-out position.

In some embodiments, the angle between the wheel and the VCM is the inverse of the splay angle of that VCM.

In some embodiments, the splay angle βs is computed as the difference between the inner lock angle βi and the average lock angle of the two wheels (indicated by βa=((βi+βo)/2), as given by:

$$\beta s = \beta i - \beta a = \beta i - \frac{\beta i + \beta o}{2} = \frac{\beta i - \beta o}{2}$$

As such, splay angle βs is equal to half the difference between inner lock angle βi and the outer lock angle βo, as required to meet the Ackermann geometry. In some embodiments, splay angle βs may be in the range of 3 degrees to 10 degrees, or in the range of 5 degrees to 8 degrees.

Table 1 presents some examples of turning radii and corresponding splay angles required for different vehicles with different wheel bases and with different types of steering (front wheel steering vs. all wheel steering).

| FWS/ AWS | Wheel-base (m) | Effective Wheel-base L (m) | Track T (m) | T/L | Turning Radius R(m) | Inner lock angle (deg) | Outer lock angle (deg) | Average-Lock Angle (deg) | Splay angle (per corner) |
|---|---|---|---|---|---|---|---|---|---|
| AWS | 2.5 | 1.25 | 1.5 | 0.60 | 2.4 | 38 | 22 | 30 | 8.0 |
| AWS | 4 | 2 | 1.5 | 0.38 | 3.7 | 35 | 24 | 30 | 5.1 |
| AWS | 3 | 1.5 | 2 | 0.67 | 2.9 | 38 | 21 | 30 | 8.6 |
| AWS | 6 | 3 | 2 | 0.33 | 5.4 | 34 | 25 | 30 | 4.6 |

-continued

| FWS/ AWS | Wheel-base (m) | Effective Wheel-base L (m) | Track T (m) | T/L | Turning Radius R(m) | Inner lock angle (deg) | Outer lock angle (deg) | Average-Lock Angle (deg) | Splay angle (per corner) |
|---|---|---|---|---|---|---|---|---|---|
| FWS | 2.5 | 2.5 | 1.5 | 0.60 | 2.6 | 53 | 37 | 45 | 8.4 |
| FWS | 4 | 4 | 1.5 | 0.38 | 4.1 | 50 | 40 | 45 | 5.3 |
| FWS | 3 | 3 | 2 | 0.67 | 3.2 | 54 | 36 | 45 | 9.1 |
| FWS | 6 | 6 | 2 | 0.33 | 6.0 | 50 | 41 | 45 | 4.8 |
| | | | | | | | | max | 9.1 |
| | | | | | | | | min | 4.6 |

Table 2 presents some examples of kerb-to-kerb turning circles and corresponding splay angles required for different vehicles with different wheel bases and with different types of steering (front wheel steering vs. all wheel steering).

| FWS/ AWS | Wheel-base L(m) | Effective Wheelbase L (m) | Track T (m) | KZK Turning Circle(m) | Tyre Width (m) | Inner-lock angle (deg) | Outer-lock angle (deg) | Cornerlock angle +/- (wave rage) (deg) | Splay angle (per corner) |
|---|---|---|---|---|---|---|---|---|---|
| AWS | 2.5 | 1.25 | 1.5 | 7.9 | 0.25 | 31 | 19 | 25 | 5.8 |
| AWS | 3 | 1.5 | 1.5 | 9.1 | 0.25 | 29 | 20 | 25 | 4.8 |
| AWS | 4 | 2 | 2 | 11.8 | 0.25 | 30 | 20 | 25 | 5.0 |
| AWS | 6 | 3 | 2 | 16.4 | 0.25 | 29 | 22 | 25 | 3.4 |
| FWS | 2.5 | 2.5 | 1.5 | 2.6 | 0.25 | 54 | 37 | 45 | 8.4 |
| FWS | 3 | 3 | 1.5 | 10.0 | 0.25 | 52 | 38 | 45 | 7.0 |
| FWS | 4 | 4 | 2 | 13.2 | 0.25 | 52 | 38 | 45 | 7.1 |
| FWS | 6 | 6 | 2 | 18.8 | 0.25 | 50 | 40 | 45 | 4.7 |
| | | | | | | | | max | 8.4 |
| | | | | | | | | min | 3.4 |

It is to be appreciated that inclusion of a splay angle, as explained herein with respect to FIGS. 3C and 3D and according to the present invention, is particularly useful when using common, or existing, non-handed corners, having front wheel steering or all wheel steering, as the inclusion of the splay angle significantly increases the vehicle maneuverability and tightens the turning circle.

In some embodiments, VCMs 20 may be installed onto the reference frame of the vehicle at the determined splay angle. In some embodiments, the splay angle between the sub-frames of the VCMs may be a static angle, which is fixed at the time of installation of the VCMs.

Figure 4:
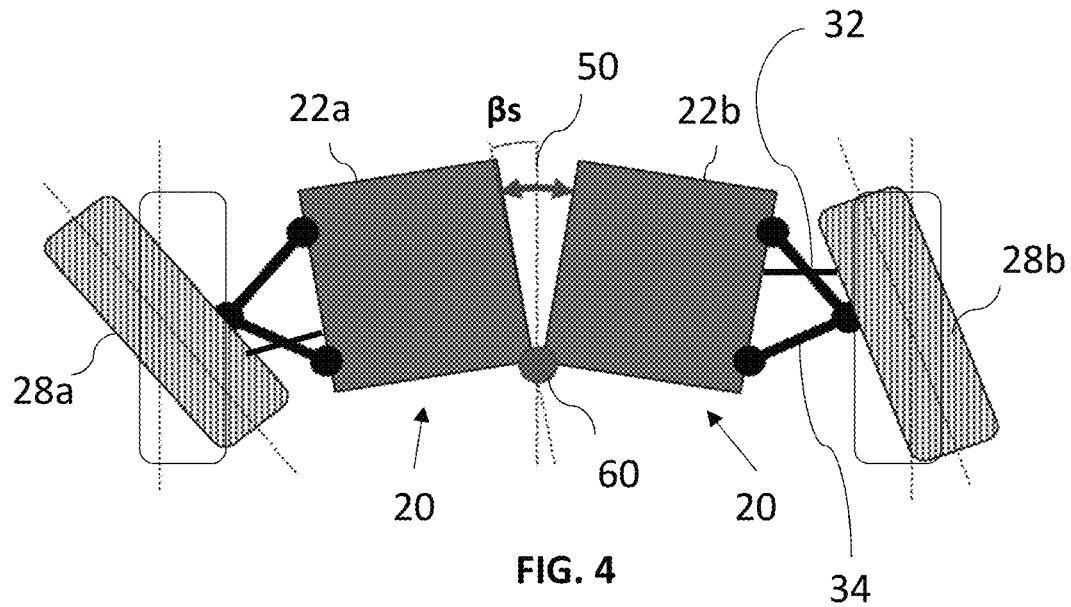
FIG. 4 is a schematic top-view illustration of non-handed VCMs installed on opposing sides of a vehicle, the VCMs being associated with a pivot actuator to transition between parallel installation and splayed installation.

Reference is now made to FIG. 4, which is a schematic top view illustration of non-handed VCMs 20 installed on opposing sides of a vehicle with a splayed installation, substantially as described hereinabove with respect to FIGS. 3C and 3D. In FIG. 4, the VCMs 20 are associated with a pivoting actuator 60, facilitating transition between parallel installation of the VCMs, and splayed installation. Pivoting actuator 60 may be functionally associated with a computerized controller of the vehicle (e.g. 16, FIG. 2) or with a VCM-controller (e.g. 38, FIG. 1) of one of the VCMs 20. In such embodiments, pivoting actuator 60 may actuate pivoting of VCM(s) 20 in response to receipt of a suitable input from the associated controller.

The arrangement of FIG. 4 may be used, for example, if it is only desired to have the VCMs installed with the splay angle during full lock turning circle maneuvers. In such a case, the VCMs may be initially installed using parallel installation, as shown for example in FIGS. 3A and 3B, to avoid excessive strain on the suspension during normal operation. When the full lock angle is required, pivoting actuator 60 may cause one or both of VCMs 20 to rotate so as to form the splay angle, thereby providing an active splay angle when such is required.

FIG. 4 illustrates a single pivoting actuator 60, causing pivoting of both VCMs 20. However, in some embodiments, each VCM may be associated with a dedicated pivoting actuator, adapted to cause that VCM to pivot about a pivot location.

In the illustrated embodiment, the pivot location is at a corner of sub-frames 22 of VCMs 20. However, the pivot location may be at a different portion of the VCM or the sub-frame.

In some embodiments, the pivoting is a manual process. In some embodiments, manual pivoting is carried out during the installation process. In some embodiments, manual pivoting is carried out post installation. In some embodiments, manual pivoting is during the operation of the vehicle.

Figure 5:
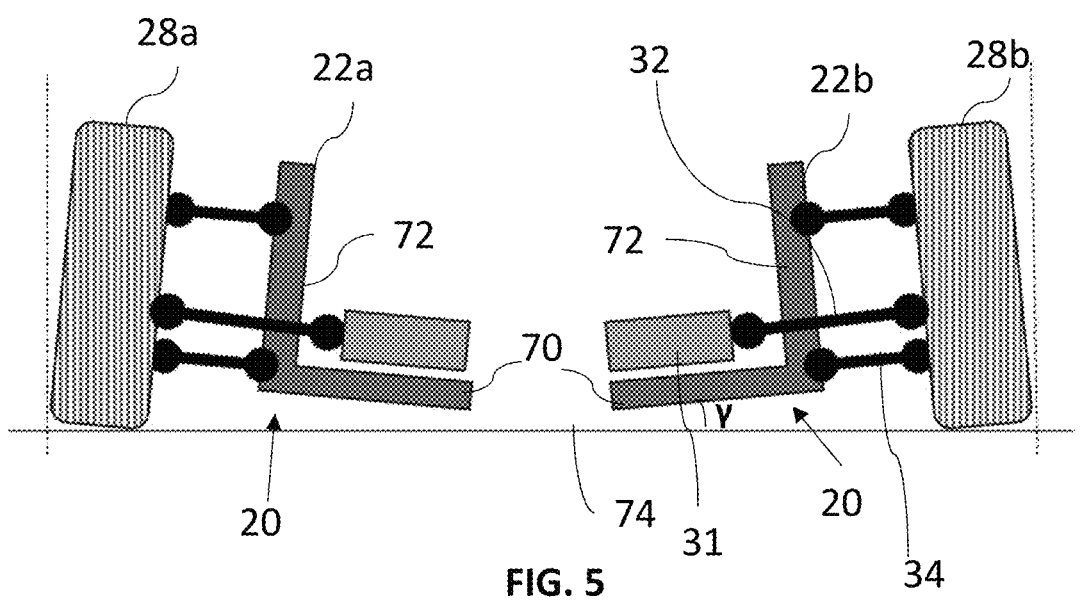
FIG. 5 is a schematic front view illustration of VCMs installed on opposing sides of a vehicle, the VCMs being installed with static camber.

Reference is now made to FIG. 5, which is a schematic front view illustration of VCMs 20 installed on opposing sides of a vehicle, the VCMs being installed with static camber. As seen, the wheels are suspended using suspension system 34 and are connected to a steering actuator 31, mounted onto the sub-frames, via the steering rod of steering system 32. Sub-frames 22a and 22b are installed such that a static camber angle γ exists between a base portion 70 thereof and a reference surface 74, such as the ground. Typically, the orientation of angles γ is opposite on opposing sides of the vehicle (i.e. the left side sub-frame 22a is at an angle γ from the reference surface, and the right side sub-frame 22b is at an angle of 180-γ degrees from the reference frame.

The static camber angle γ may coexist with the splay angle described hereinabove with respect to FIGS. 3C to 4. Use of a static camber angle, in addition to a splay angle as described herein, enables optimization of tire wear for a given laden condition, and improves vehicle grip, front-rear handling balance, and drift on cambered roads.

Figure 6:
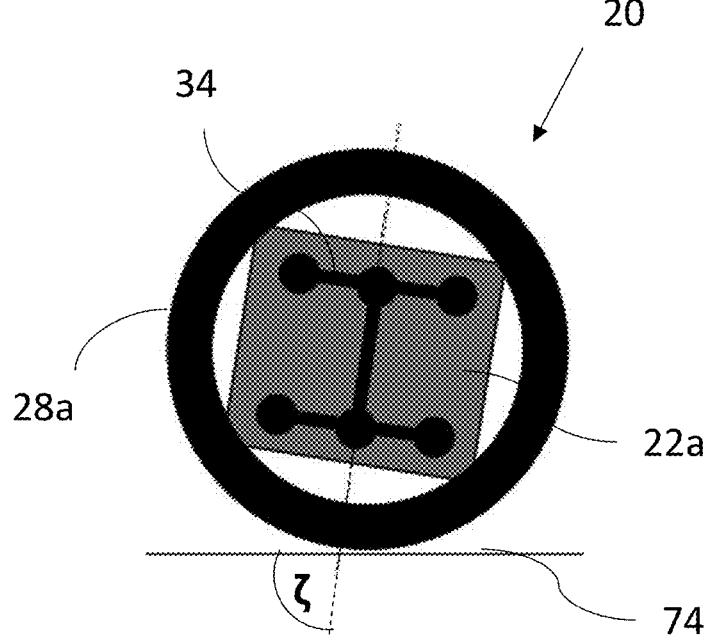
FIG. 6 is a schematic side view illustration of a VCM according to embodiments of the disclosed technology, demonstrating a caster angle of the wheel.

Reference is now made to FIG. 6, which is a schematic side view illustration of a VCM according to embodiments of the disclosed technology, demonstrating a caster angle of the wheel.

As seen, wheel 28a is mounted onto sub-frame 22a such that suspension system 34 is disposed at a caster angle ζ relative to reference surface 74. Increased caster angles improve steering returnability. Additionally, inclining the VCM as shown adds anti-dive, or a squat in a direction opposite to the rear axle, which helps reduce the pitch of the vehicle during acceleration or braking.

CONCLUDING COMMENT

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A vehicle comprising:
   a vehicle platform including a reference frame, the reference frame arranged along a longitudinal axis and including at least first and second VCM-connection interfaces, disposed on opposing sides of the vehicle platform;
   a first vehicle corner module (VCM) connected to the first VCM-connection interface and a second VCM connected to the second VCM connector interface, the first and second VCMs adapted for regulating motion of the vehicle, each of the first and second VCMs comprising:
      a sub-frame including a vehicle-connection interface reversibly and mechanically engaging a corresponding one of the first and second VCM-connection interfaces;
      a wheel-hub assembly comprising a wheel-hub adapted for mounting of a wheel thereon; and
      at least one subsystem of the vehicle, mounted onto the sub-frame, the at least one subsystem being selected from the group of subsystems consisting of a drive subsystem, a steering subsystem, a suspension subsystem, and a braking subsystem, wherein, at least one of the first VCM and the second VCM is disposed at a splay angle relative to the longitudinal axis.

2. The vehicle of claim 1, wherein the first VCM and the second VCM are installed at the splay angle relative to the longitudinal axis.

3. The vehicle of claim 1, wherein the sub-frame of the at least one of the first VCM and the second VCM is disposed at the splay angle relative to the longitudinal axis.

4. The vehicle of claim 1, wherein the sub-frames of each of the at least one of the first VCM and the second VCM are disposed at the splay angle relative to the longitudinal axis.

5. The vehicle of claim 1, wherein the first and second VCMs are non-handed, such that each of the first and second VCMs can be installed on either the left or the right side of the reference frame of the vehicle.

6. The vehicle of claim 1, wherein each of the first and second VCMs includes a wheel mounted onto the wheel-hub thereof, and wherein, when the wheels of the first and second VCMs are rotated in a first direction to their maximal lock angle, the wheels maintain Ackermann geometry.

7. The vehicle of claim 1, further comprising at least one pivoting actuator, adapted to actuate pivoting of the sub-frame of at least one of the first and second VCMs relative to the longitudinal axis of the reference frame, between a first operative orientation and a second operative orientation, wherein in the first operative orientation the sub-frame of the VCM is disposed at the splay angle relative to the longitudinal axis, and in the second operative orientation the sub-frame is disposed parallel to the longitudinal axis.

8. The vehicle of claim 7, wherein the at least one pivoting actuator comprises a single pivoting actuator, adapted to actuate pivoting of the subframes of the first and second VCMs relative to the longitudinal axis of the reference frame.

9. The vehicle of claim 8, wherein the single pivoting actuator is adapted to actuate pivoting of the subframe of the first VCM in a first direction, and to actuate pivoting of the subframe of the second VCM in a second direction, the second direction being opposite to the first direction.

10. The vehicle of claim 7, wherein the at least one pivoting actuator comprises a first pivoting actuator adapted to actuate pivoting of the subframe of the first VCM relative to the longitudinal axis, and a second pivoting actuator adapted to actuate pivoting of the subframe of the second VCM relative to the longitudinal axis.

11. The vehicle of claim 1, wherein the subframes of the first and second VCMs installed onto to the reference frame at the splay angle, and the splay angle remains static throughout connection of the first and second VCMs to the reference frame.

12. The vehicle of claim 1, wherein the subframes of the first and second VCMs are disposed at an angle relative to each other.

13. A method of installing first and second vehicle corner modules (VCMs) on a vehicle platform, the vehicle platform including a reference frame, the reference frame arranged along a longitudinal axis and including at least first and second VCM-connection interfaces, disposed on opposing sides of the vehicle platform, the method comprising:
   connecting a sub-frame of the first VCM to the first VCM-connection interface and a sub-frame of the second VCM connected to the second VCM connector interface, the first and second VCMs adapted for regulating motion of the vehicle; and
   adjusting a splay angle of the sub-frames of at least one of the first and second VCMs, relative to the longitudinal axis of the vehicle platform.

14. The method of claim 13, wherein the adjusting comprises adjusting the splay angle of the sub-frames of both the first and second VCMs relative to the longitudinal axis of the vehicle platform.

15. The method of claim 13, wherein the adjusting comprises adjusting the splay angle in accordance with a desired steering angle.

16. The method of claim 13, wherein the adjusting comprises adjusting the splay angle in accordance with at least one parameter of the vehicle platform.

17. The method of claim 16, wherein the at least one parameter is selected from the group consisting of a size of the vehicle platform, a condition of the vehicle platform, and a type of the vehicle platform.

18. The method of claim 13, wherein the adjusting comprises adjusting the splay angle in accordance with at least one parameter of at least one of the first and second VCMs.

19. A vehicle platform comprising:
   a reference frame, the reference frame arranged along a longitudinal axis;
   a first wheel assembly and a second wheel assembly, the first and second wheel assemblies being connected to opposing sides of the reference frame, each of the first and second wheel assemblies including:
      a wheel-hub adapted for mounting a wheel thereon;
      a steering system adapted for steering the wheel-hub, wherein at least one of the first wheel assembly and the second wheel assembly is disposed at a splay angle relative to the longitudinal axis of the reference frame.

20. The vehicle platform of claim 19, wherein each of the first wheel assembly and the second wheel assembly is installed at the splay angle relative to the longitudinal axis.

21. The vehicle platform of claim 19, wherein each of the first and second wheel assemblies includes a wheel mounted onto the wheel-hub thereof, and wherein, when the wheels of the first and second wheel assemblies are rotated in a first direction to their maximal lock angle, the wheels maintain Ackermann geometry.

22. The vehicle platform of claim 19, further comprising first and second suspension arms, connected to the reference frame, and functionally associated with the first and second wheel assemblies, respectively.

* * * * *